US010951717B2

(12) United States Patent
Nainar et al.

(10) Patent No.: US 10,951,717 B2
(45) Date of Patent: Mar. 16, 2021

(54) DIFFERENTIATED SERVICES WITHIN A SERVICE MESH

(71) Applicant: Cisco Technology, Inc., San Jose, CA (US)

(72) Inventors: Nagendra Kumar Nainar, Morrisville, NC (US); Carlos M. Pignataro, Cary, NC (US); Jerome Henry, Pittsboro, NC (US); Robert Edgar Barton, British Columbia (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 87 days.

(21) Appl. No.: 16/156,987

(22) Filed: Oct. 10, 2018

(65) Prior Publication Data

US 2020/0120168 A1    Apr. 16, 2020

(51) Int. Cl.
*G06F 15/173* (2006.01)
*H04L 29/08* (2006.01)
*H04L 12/725* (2013.01)

(52) U.S. Cl.
CPC .............. *H04L 67/16* (2013.01); *H04L 45/30* (2013.01)

(58) Field of Classification Search
CPC ....................................................... H04L 67/16
USPC ........................................................ 709/223
See application file for complete search history.

(56) References Cited

U.S. PATENT DOCUMENTS

| 2008/0002592 | A1* | 1/2008 | Yegani ................. H04W 28/02 370/252 |
| 2016/0124742 | A1 | 5/2016 | Rangasamy et al. |
| 2017/0332154 | A1* | 11/2017 | Moore .................... H04L 65/80 |
| 2018/0191635 | A1* | 7/2018 | Karthikeyan ......... H04L 45/302 |
| 2020/0050494 | A1* | 2/2020 | Bartfai-Walcott .... G06F 9/5083 |
| 2020/0177494 | A1* | 6/2020 | Franzen ................. H04L 69/22 |

OTHER PUBLICATIONS

International Search Report and Written Opinion from the International Searching Authority, dated Jan. 23, 2020, 13 pages, for corresponding International Patent Application No. PCT/US20129/053583.
Indrasiri, Kasun, "Service Mesh for Microservices—Microservices in Practice—Medium," Sep. 15, 2017, 6 pages.

* cited by examiner

*Primary Examiner* — Hee Soo Kim
(74) *Attorney, Agent, or Firm* — Polsinelli PC (57) ABSTRACT

Systems, methods, and computer-readable media for differentiating service within a service mesh. A translator service receives network traffic directed to a service mesh from a communications network. The translator service can determine a service characteristic for the network traffic and update rulesets within the service mesh based on the determined service characteristic. The updated rulesets enable the service mesh to differentiate services for the network traffic similarly to forwarding rules within the communications network.

20 Claims, 7 Drawing Sheets

DIFFERENTIATED SERVICES WITHIN A SERVICE MESH

TECHNICAL FIELD

The present technology pertains to networking technologies, and more specifically to traffic prioritization within a backend service mesh.

BACKGROUND

Traffic over communications networks is often associated with various service characteristics such as, for example, Quality of Service (QOS) which impact how the traffic is routed and processed throughout the communications network. For example, a high Quality of Service (QOS) may indicate that a message should always receive priority in forwarding and can cause associated traffic to be forwarded and processed throughout the communications network at the expense or delay of lower Quality of Service (QOS) traffic.

Traffic will often make its way into a service mesh for processing. Service meshes typically include large amalgamations of microservices which provide specialized functional processes for processing data and are interconnected via virtual and/or local networks. Once traffic leaves a communications network and enters into a microservice mesh, forwarding and processing rules that are enforced on, for example, a data plane of the communications network are no longer applicable within the microservice mesh. As a result, service characteristics and the like are not maintained from the communications network and into the microservice mesh.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

BRIEF DESCRIPTION OF THE ATTACHMENTS

The attached documents, incorporated herein by reference, includes a multitude of drawings, descriptions, screenshots, figures, and/or other disclosure which provide details and further understanding of various aspects of the subject technology.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A translator service receives network traffic directed to a service mesh from a communications network. The translator service can determine a service characteristic for the network traffic and update rulesets within the service mesh based on the determined service characteristic. The updated rulesets enable the service mesh to differentiate services for the network traffic similarly to forwarding rules within the communications network.

In some examples, the rulesets may include destination based differentiation. In particular, microservices within the service mesh can be dedicated to certain service characteristics and a destination can be determined based on the dedicated microservices corresponding to a determined service characteristic of network traffic as it is received. In some examples, the rulesets may include a heuristic value, such as color coding, corresponding to a determined service characteristic. Further, traffic within the service mesh may be forwarded throughout the service mesh based at least in part on a heuristic value injected into the traffic before it enters the service mesh.

Example Embodiments

Various embodiments of the subject technology relate to prioritizing services within a backend service mesh for a communications network. Service characteristics, such as Quality of Service (QOS) markings, are typically applied to network traffic as messages percolate across communications networks. However, once a message enters a service mesh of intercommunicating microservices, traffic may be unable to be prioritized across microservices based on service characteristic markings because packets are processed from one microservice to another.

Microservice meshes may contain a control plane agent for instantiating sidecars associated with respective network containers throughout a network including the microservice mesh. Furthermore, the control plane agent may instantiate routing rules and policies on the sidecars for directing API calls from within and outside of the microservice mesh to an appropriate microservice (or microservice group). The API call itself, cookies (e.g., text encoded static information associated with an originator), and/or application header information within the message can be used to identify a location (e.g., port, domain name, etc.) of each sequential service within the microservice mesh for processing the API call message. In general, the control plane agent, and thus the microservices mesh, may lack service differentiation for substantially similar API calls and the like. For example, an API call of type_1 from service_A to service_B may require higher priority in application and network forwarding layers (e.g., a higher Quality of Service (QOS) in the network forwarding layer) as compared to an API call of type_2 service_A to service_B. The API call type may reflect a particular originator (e.g., subscriber identity) or a service characteristic over which the API call is transmitted (e.g., a Quality of Service (QOS), and the like).

In one example, network traffic can first be classified into one or more of several categories. For example, network based application recognition (NBAR) or application visibility and control (AVC) services can classify messages going over the network based on message characteristics (e.g., ownership/subscriber information associated with the message) or information included within the message (e.g., Quality of Service (QOS) information and the like).

The network based application recognition (NBAR) or application visibility and control (AVC) services can be provided by a network application, such as a router for incoming traffic, or returned by an enriched domain name service (DNS) as a label (e.g., domain name service as authoritative source (DNS-AS)). Nevertheless, traffic flow (e.g., messages) can be classified into possible traffic classes such as, for example and without imputing limitation, a traffic class, a business-relevance class (e.g., business-relevant, default, business-irrelevant), and a differentiated services code point (DSCP) class. For example, a traffic flow, or series of messages, may be associated with a first user and be determined to be business-critical while a second flow, or series of messages, may be associated with a second user and be determined to be business-relevant (e.g., a lower priority than business-critical, etc.). In some examples, the classified or labeled traffic can be marked according to the class and provided to a Quality of Service (QOS) aware load-balancer. In order to mark the traffic, a flag can be included in an associated message header or a preceding message can be sent with marking information along with respective messages of the traffic. The load-balancer may interpret the mark in order to prioritize traffic flows within the services mesh based on the class represented by the mark.

In some examples, a Quality of Service (QOS) translator may receive the marked traffic prior to receipt by the load-balancer in order to determine appropriate rules (e.g., service mesh traffic flows, etc.) for the marked traffic. As a result, the load-balancer need not be Quality of Service (QOS) aware. Instead, the translator can transmit the determined rules to the load-balancer prior to the respective traffic being received by the load-balancer. Furthermore, sidecars associated with various microservices within the services mesh (e.g., those microservices corresponding to the respective traffic) can also receive rules from the translator based on the traffic mark.

In effect, forwarding logic of the services mesh can be modified to follow networking Quality of Service (QOS) techniques and the like by the translator via the determined rules. For example, an approximate fair dropping (AFD) rule at the network level can be enforced in services mesh by the translator appropriately updating rules for marked traffic. Traffic marked as, for example and without imputing limitation, business-critical or business-relevant (e.g., high importance) can be forward before all other traffic or forwarded to dedicated slices within the service mesh. Traffic of medium importance can be forwarded through the service mesh according to a target bandwidth and burst rate. Traffic of lower importance can be forwarded through the service mesh only when no other traffic is present. Said rules can be provided to indicated sidecars as traffic is received.

As can be seen below, flow priority rulesets for a microservice mesh can correspond to, and be produced from, a network ruleset. For example and without imputing limitation, microservice mesh rulesets can apply a class based weighted fair queuing (CBDWFQ) and/or low latency queuing (LLQ) scheme which, respectively, determine a priority based on additional weights associated with a transmission and a heightened priority based on latency characteristics associated with a transmission.

```
kind: RouteRule
metadata:
    name: ratings-delay
```

```
    spec:
        destination:
            name: reviews
        match:
            request:
                headers:
                    cookie:
                        regex: "User_1"
        route:
            - labels:
                version: v2
              weight: 25
            - labels:
                Version: v1
              weight: 75
        match:
            request:
                headers:
                    cookie:
                        regex: "User_2"
        delay:
            percent: 10
            fixedDelay: 5s
```

In the above extract, traffic matched to "User_1" (here, denoted as a "regex," or regular expression, located within the cookies of a message, is allotted a 25% weight, or proportional allotment, to a microservice instance "v2" and a 75% weight to a microservice instance "v1." In comparison, messages including a regex for "User_2" within a respective cookies field undergo a delay of five seconds applied to 10% of traffic. While the rules of the above extract are relatively simple, rulesets can be as complex as needed. For example, in the extract below, rules dictate that User_2 traffic receives 100% of resources of microservice instance v1 in general circumstances. However, where traffic from User_1 is detected, User_2 traffic receives only 30% of v1 resources while User_1 traffic receives 70%.

```
    kind: RouteRule
    metadata:
        name: reviews-two
    spec:
        destination:
            name: reviews
        precedence: 2
        match:
            request:
                headers:
                    cookie:
                        regex: "User_1"
        route:
            - labels:
                version: v1
              weight: 70
        match:
            request:
                headers:
                    cookie:
                        regex: "User_2"
        route:
            - labels:
                version: v1
              weight: 30
    kind: RouteRule
    metadata:
        name: reviews-default
    spec:
        destination:
            name: reviews
        precedence: 1
        match:
            request:
                headers:
                    cookie:
                        regex: "User_2"
        route:
            - labels:
                version: v1
              weight: 100
```

The extract above may be generated where, for example, the translator receives network traffic from User_1 flagged according to differentiated services code point (DSCP) as critical services (e.g., CS4) and network traffic from User_2 flagged according the same as having a relatively low assured forwarding rank (e.g., AF13). The flagging may be performed by an application visibility and control (AVC) service prior to traffic entering the service mesh. As a result, traffic from User_1 can be balanced across microservice instances to achieve faster processing while traffic from User_2 is delayed to account for User_1 traffic.

The translated rules (e.g., extracted above) can be provided to microservices and/or sidecars for microservice instances in order to enforce them across the microservice mesh traversed by respective network traffic. For example, the above extracts can be provided only to microservices v1 and v2, and/or respective sidecars as those are the only microservice instances indicated by the respective rulesets. In addition, preceding microservices (e.g., microservices which provide traffic to v1 and v2) can also receive the rulesets in order to ensure microservice mesh traffic flows similarly to its network traffic counterpart. As a result of the parity in network traffic flow and microservice mesh traffic flow, users may avoid inconsistent service quality resulting from mismatches in network and microservice mesh priority logics.

In another example, an end-to-end Quality of Service (QOS) treatment within the service mesh can be provided by generating a routing rule using fully qualified domain name (FQDN) based addressing to shape microservice mesh traffic. For example, a different microservice instance name identifier can be utilized for forwarding messages based on a detected service characteristic (e.g., Quality of Service (QOS), etc.) for respective messages. The extract below shows one example of this:

```
    kind: RouteRule
    metadata:
        name: service-call-qos
    spec:
        destination:
            name: API-high-priority
            namespace: default
            domain: srv.entity.local
        match:
            source:
                name: reviews
            request:
                headers:
                    cookie:
                        regex: "high-priority-pathway"
    kind: RouteRule
    metadata:
        name: service-call-qos
    spec:
        destination:
            name: API-low-priority
            namespace: default
            domain: srv.entity.local
```

```
        match:
          source:
            name: reviews
```

In particular, the above ruleset will cause a sidecar to forward any received messages from a source "reviews" and including a cookie having a regular expression "high-priority-pathway" to fully qualified domain name (FQDN) API-high-priority.default.src.entity.local (e.g., a destination as defined by "name", "namespace", and "domain" fields). All other messages from the "reviews" source (e.g., lacking the cookie having the regular expression "high-priority-pathway") will be processed under "API-low-priority" and will be forwarded to fully qualified domain name (FQDN) API-low-priority.default.srv.entity.local.

Additionally, a domain name service (DNS) (e.g., kube-DNS, etc.) for the microservice mesh may be programmed with different internet protocol (IP) addresses for each fully qualified domain name (FQDN) so that forwarding can be properly resolved within the microservice mesh. The extract below illustrates a ruleset for a domain name service (DNS), here kube-DNS, assigning an address from a locally reserved range.

```
kind: ConfigMap
metadata:
   name: kube-dns
   namespace: kube-system
data:
   stubDomains: |
      {"API-high-priority.default.srv.entity.local": ["2001:ABCD::1"]}
      {"API-low-priority,default.srv.entity.local": ["2001:ABCD::2"]}
```

Using, for example, a vector packet processing (VPP) service communicating with the translator, relevant service characteristics, such as quality of service (QOS) treatment and the like, can be identified and translated address information corresponding to the above extract can be injected into processed messages so that relevant propagation and target address information is included in a header portion. For example, the extract below may be injected into the header:

2001:ABCD::1→2001:2222::1;DSCP=EF

2001:ABCD::2→2001:2222::1;DSCP=default

In some examples, the translator may augment a name resolution system, or domain name service (DNS), such as kube-dns, to include a heuristic indicator such as, for example and without imputing limitation, a color coding system and the like, in effect, each namespace may be assigned one or more colors, each of which are associated with a service characteristic (e.g., Quality of Service (QOS), etc.) value. The color can then be used by service mesh rulesets to route messages through the service mesh accordingly. The extract below illustrates example RouteRule and domain name service (DNS) rulesets for accomplishing an augmented color coding system:

```
kind: RouteRule
metadata:
   name: service-call-qos
spec:
   destination:
      name: API-high-priority
      namespace: default
      domain: srv.entity.local
   match:
      source:
         name: reviews
         color: red
kind: ConfigMap
metadata:
   name: kube-dns
   namespace: kube-system
data:
   stubDomains: |
      ("API-high-priority.default.srv.entity.local": ["2001:ABCD::1"],
         [red=ef, green=af21, yellow=af11]}
```

Figure 1:
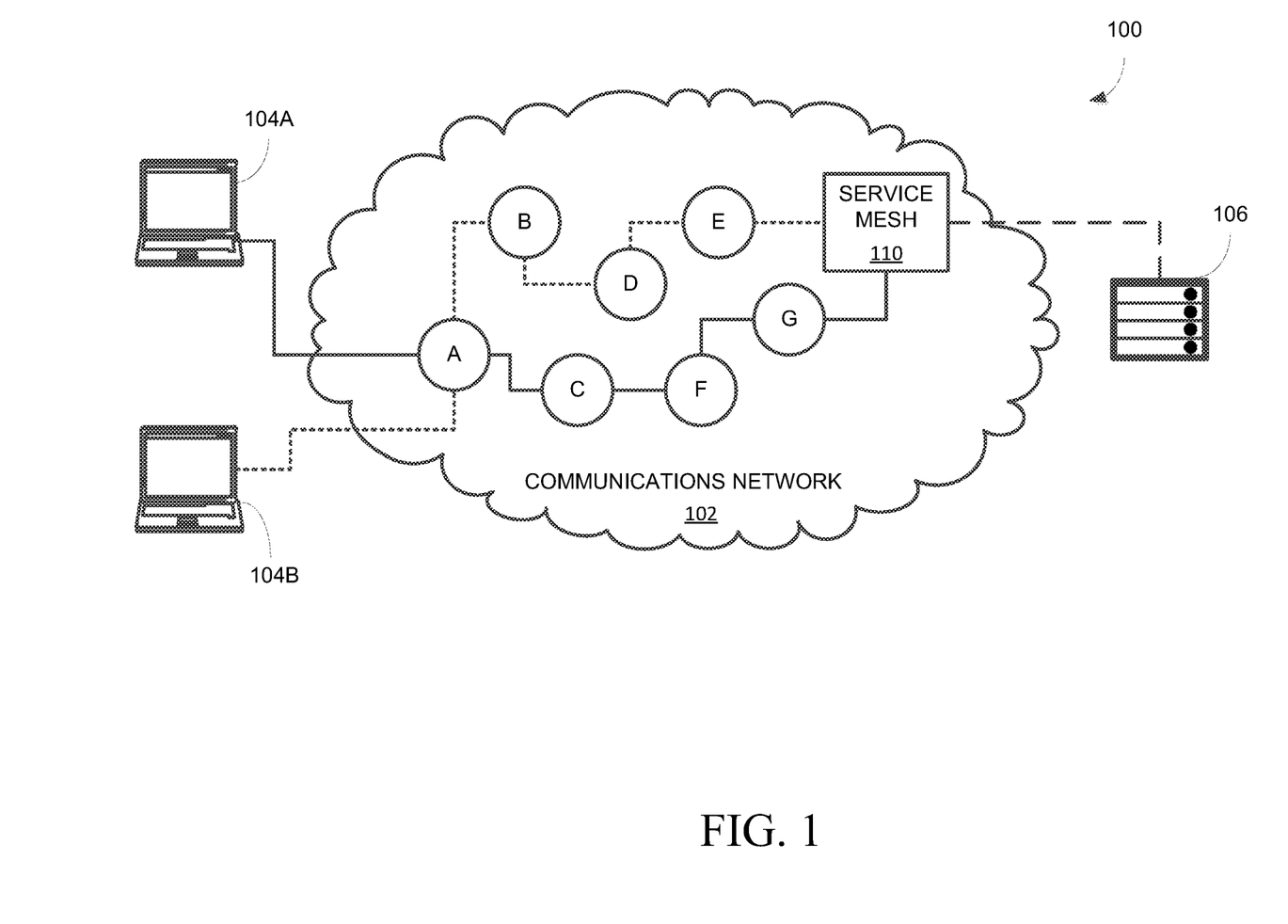
FIG. 1 illustrates an example communications network environment in accordance with various embodiments.

FIG. 1 depicts an operating environment 100 for transmitting messages between network connected devices. Network connected devices may include computers, mobile devices, smartphones, servers, etc. Network connected devices communicate over a communications network 102. Communications network 102 may be the Internet, a mobile network, local area network (LAN), or combination of the aforementioned and the like.

As depicted in FIG. 1, computers 104A-B each respectively communicate with server 106 over communications network 102. Communications network 102 includes network hops A-G. Hops A-G includes routers, switches, and the like for forwarding network traffic (e.g., messages, etc.) through communications network 102. In particular, traffic flow across hops A-G can be managed by a data plane defining forwarding, routing, drop rate, delay, and others rules as will be apparent to a person having ordinary skill in the art.

Hops A-G forward traffic to a service mesh 110 before being output to server 106. In some examples, service mesh 110 may provide API calls, service calls, transformations, etc. for exchanging traffic between communications network 102 and server 106.

Here, communications network 102 manages network traffic associated with computer 104A differently from traffic associated with computer 104B. In particular, as indicated by the solid line, messages from computer 104A are forwarded through hops A, C, F, and G before being received by service mesh 110. In some examples, a data plane associated with communications network 102 may be responsible for determining said path through the network. For example, messages from computer 104A may include a service characteristic indicating a higher Quality of Service (QOS) and the like and so may be forwarded through preferred routers (e.g., to maintain high speeds, low latencies, etc.).

In comparison, messages from computer 104B follow a path through communications network 102 indicated by a dashed line. Here, messages from computer 104B to server 106 are forwarded through hops A, B, D, and E before being received by service mesh 110. The routing path indicated by the dashed line may indicate a lower Quality of Service (relative to the traffic of computer 104A), or other differentiated service characteristic. However, while traffic from computers 104A-B may be differentiated by the data plane for communications network 102, the data plane may be unable to continue differentiating service for traffic within service mesh 110.

Figure 2:
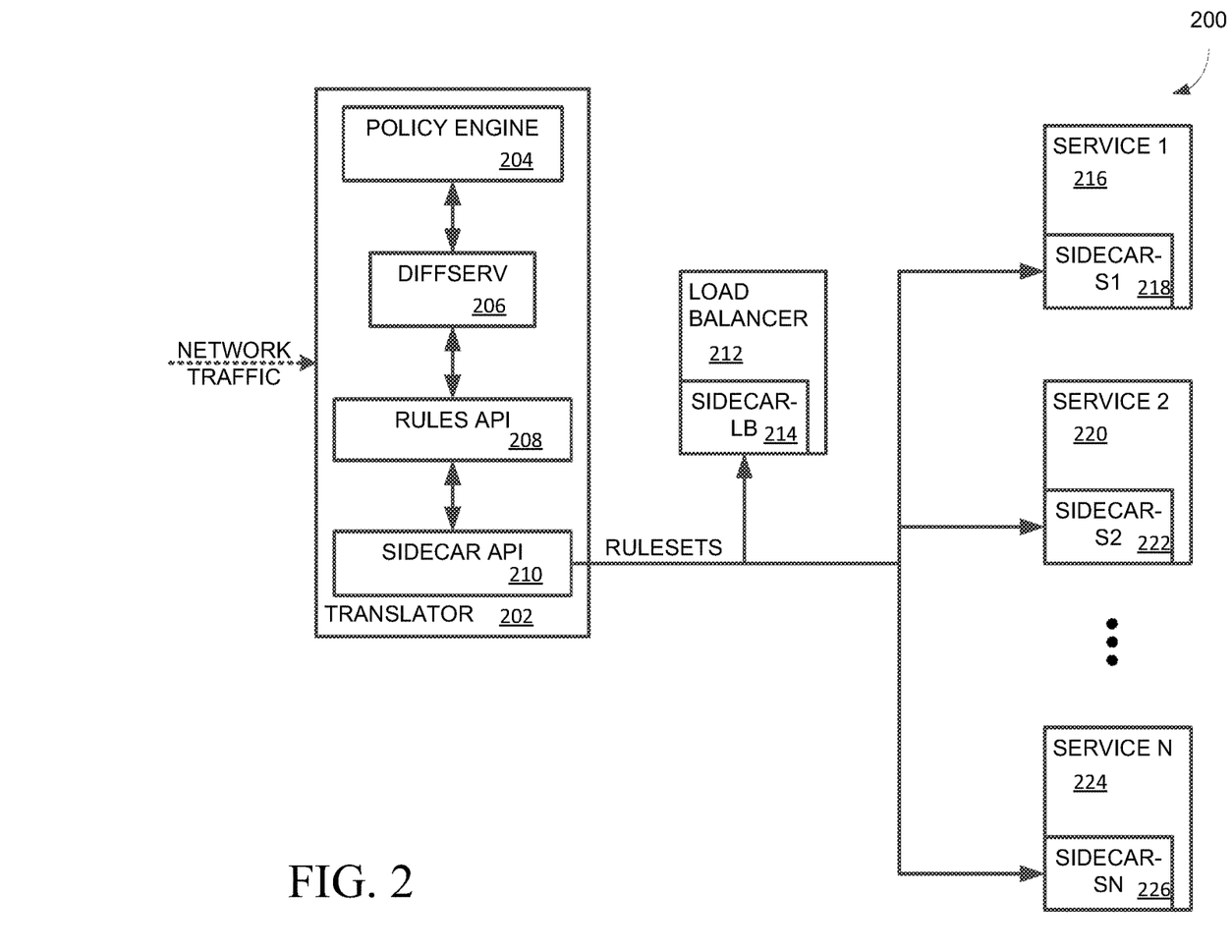
FIG. 2 illustrates an example service mesh environment in accordance with various embodiments.

FIG. 2 depicts a service mesh environment 200 capable of differentiating service for traffic across multiple microservices of service mesh environment 200. Service mesh environment 200 can, for example, be service mesh 110 discussed above. In particular, service mesh environment 200 receives network traffic from a connected network environment such as, for example, communications network 102.

Service mesh environment 200 includes a translator 202, receiving network traffic, in communication with multiple microservices forming a service mesh. Here, microservices include a load balancer 212, service 1 216, service 2 220, and service n 224 (e.g., indicating an arbitrary number of microservices which may be instantiated and/or decommissioned as needed, such as based on network load, etc.).

Translator 202 includes a policy engine 204, a diffserv 206, rules application programming interface (API) 208, and a sidecar application programming interface (API) 210. Translator 202 generates rulesets for differentiating service for messages (e.g., network traffic) across services 216-224. In particular, translator 202 uses sidecar application programming interface (API) 210 to communicate with load balancer 212 and services 216-224. Sidecar application programming interface (API) 210 may enable translator 202 to communicate directly with a sidecar-1b 214 associated with load balancer 212 and sidecars s1-sn 218, 222, 226 associated with services 1-n 216, 220, 224, respectively.

Translator 202 generates rulesets by retrieving current rulesets from sidecars 214, 218, 222, 226 and service policies (e.g., load probabilities, drop rates, forwarding information, etc.) from policy engine 204 related to the received network traffic. Diffserv 206 can identify mismatches between current rulesets from rulesets adhering to the service policies. Translator 202 may then produce conforming rulesets based on the differences identified by diffserv 206.

Figure 3:
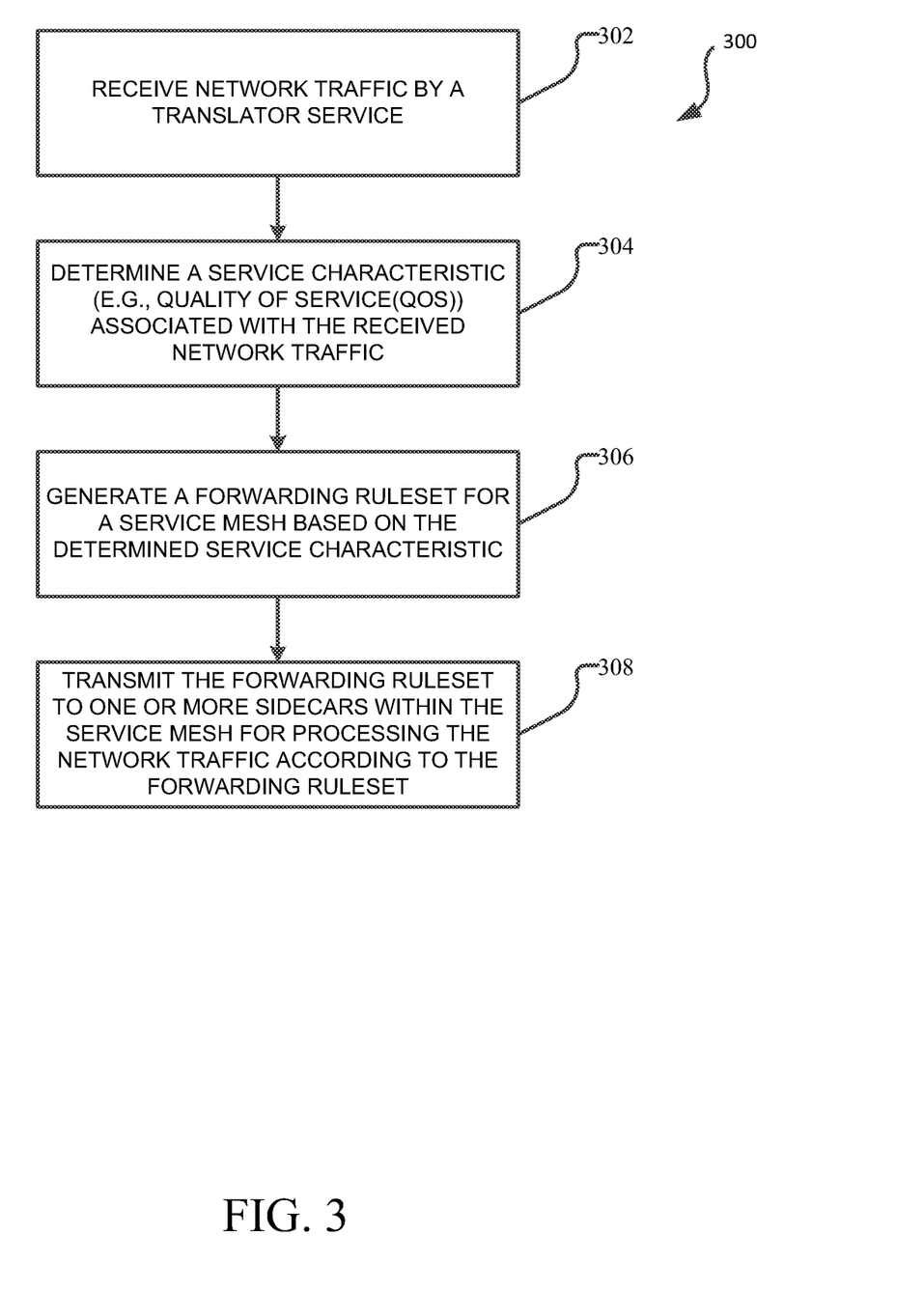
FIG. 3 illustrates an example method for applying service differentiation rulesets throughout a service mesh in accordance with various embodiments.

FIG. 3 depicts a method 300 for enabling provision of differentiated services by a service mesh (e.g., such as service mesh 110, etc.). In some examples, translator 202 performs method 300 in order to update rulesets across various microservices 216-224.

A translator service (e.g., translator 202) receives network traffic at step 302. In some examples, the translator service may be part of a backend service mesh or act as a gateway service or portal (e.g., acting as a pass-through for traffic entering the service mesh). In some examples, multiple instantiations of the translator service may operate simultaneously in order to facilitate and smooth traffic into and through the service mesh.

At step 304, the translator determines a service characteristic, such as a quality of service (QOS), associated with the received network traffic. For example, the service characteristic may be indicated in a respective header of one or more messages of the network traffic. In some examples, the translator may observe forwarding behavior related to the traffic across an associated communications network (e.g., through communication with a network data plane, integration with a policy service such as a policy control function (PCF), etc.) in order to determine the service characteristic.

Nevertheless, the translator generates a forwarding ruleset for a service mesh based on the determined service characteristic at step 306. In some examples, this may be a rules-based generation wherein certain predetermined service characteristics each cause, on detection, certain respective predetermined forwarding rulesets for the service mesh to be generated. In some examples, probabilistic or learned rules may be used to generate forwarding rulesets, or some combination of the above. The rulesets can indicate which services and/or service instantiations receive which traffic or what proportion of traffic, prioritization schemes for processing traffic, forwarding paths through the service mesh, or some combination of these and other service differentiation features.

At step 308, the forwarding ruleset is then generated to one or more sidecars within the service in order to update traffic flow through the service mesh. In particular, the rulesets may be provided to sidecars associated with respective microservices within the service mesh via, for example, sidecar application programming interface (API) 210 and the like. As a result, the service mesh can differentiate provision of services in a similar fashion as to what occurs within a larger communications network via a data plane.

Figure 4:
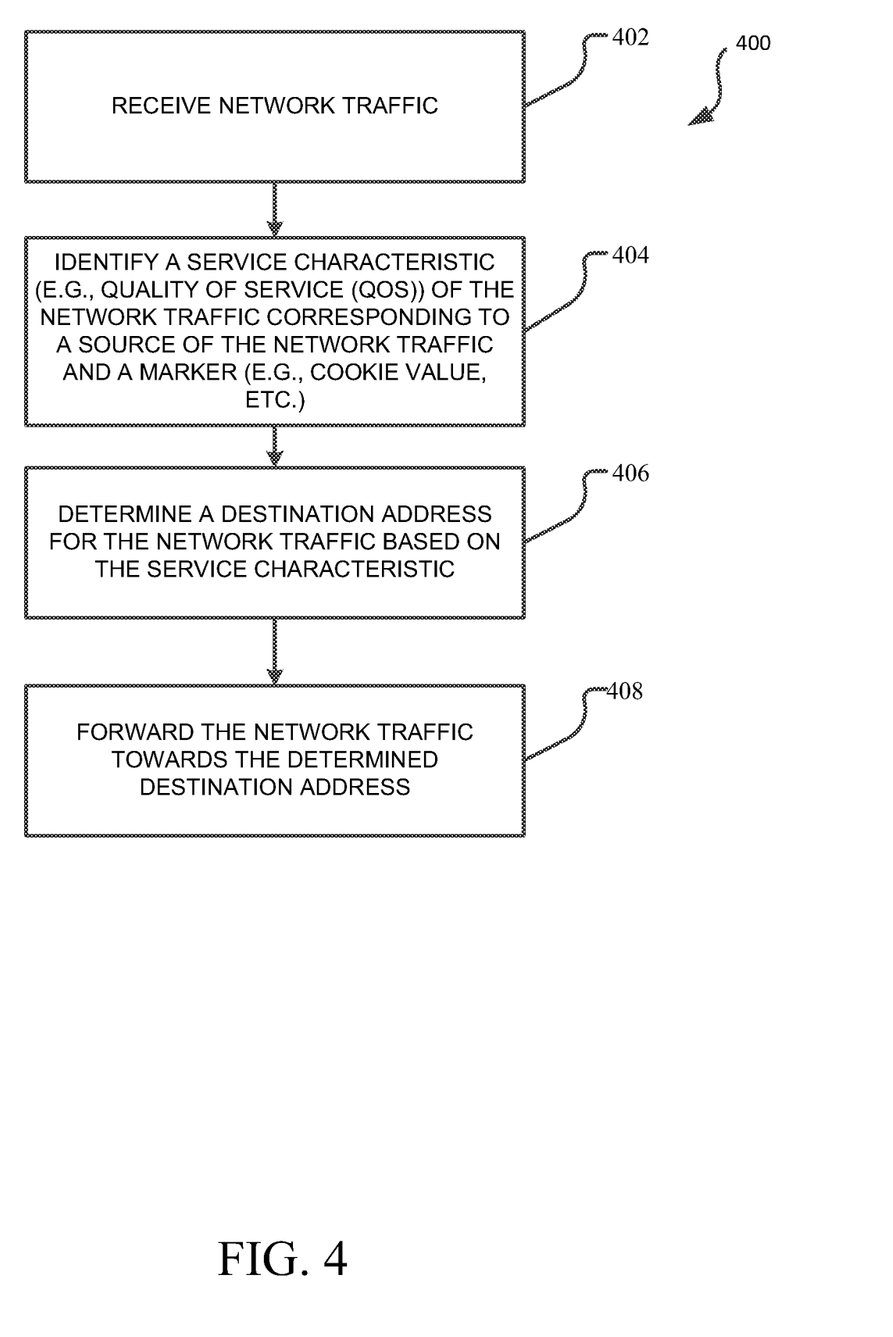
FIG. 4 illustrates an example method for differentiating service within a service mesh using fully qualified domain name based addressing in accordance with various embodiments.

FIG. 4 depicts a method 400 for forwarding traffic through a service mesh based on associating a destination with a service characteristic. In other words, portions of a service mesh can be assigned to particular service characteristics, such as Quality of Service (QOS), etc., assigned to network traffic. In effect, the service mesh can be sliced in a similar fashion to a communications network.

At step 402, network traffic is received by, for example, the service mesh. In some examples, the translator of method 300, acting as a portal or gateway into the service mesh, receives the network traffic and performs method 400 in addition, or as alternative, to method 300. In some examples, a load balancer instantiation (e.g., load balancer 212 discussed above) receives the network traffic and includes a ruleset comprising method 400 further discussed below.

At step 404, a service characteristic, such as Quality of Service (QOS) and the like, is identified which corresponds to a source of the received network traffic. The service characteristic may be included within headers of respective messages of the network traffic or may be retrieved by communicating with a policy engine, such as a policy control function (PCF), and the like. In some examples, a cookie value within the header, such as a subscriber name, origin address, policy group, etc., can be used to determine the service characteristic.

The service characteristic can then be used to determine a destination address for the network traffic, at step 406. For example, a lookup table can be used to retrieve a destination address within the service mesh for the traffic. In some examples, the destination address may be injected into the traffic before continuing downstream (e.g., into the service mesh). In some examples, the destination address may indicate a next hop or service for the traffic, where the traffic may be processed similar (e.g., use the service characteristic to determine another next destination). Nevertheless, at step 408, the traffic is forwarded towards the determined destination address.

Figure 5:
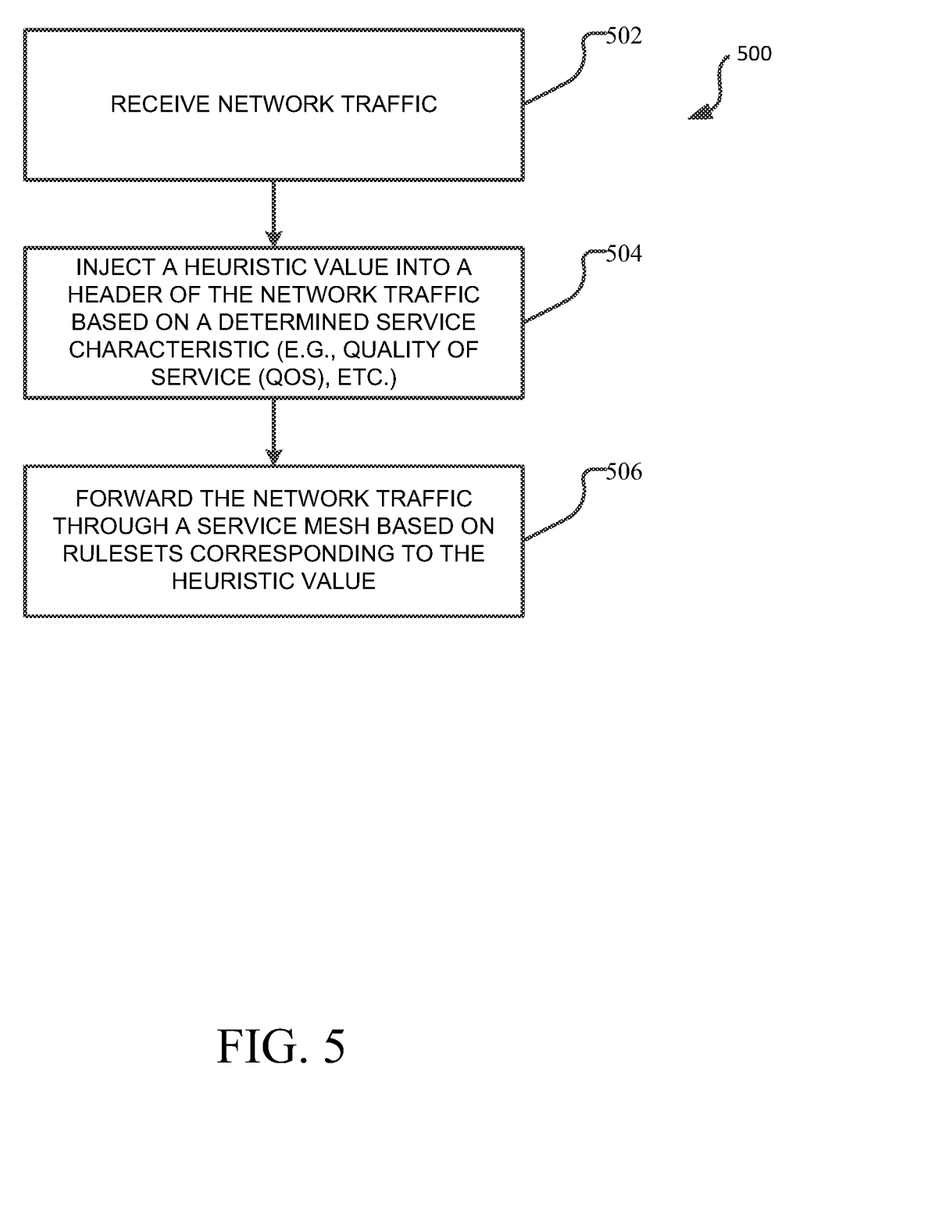
FIG. 5 illustrates an example method for differentiating service within a service mesh using indicator heuristics in accordance with various embodiments.

FIG. 5 depicts a method 500 for forwarding traffic through a service mesh using a heuristic indicator. The heuristic indicator may be used at each participating microservice within the service mesh to determine a next stop. For example, each microservice may include a list of available next stops associated to some degree with various values of the heuristic.

At step 502, network traffic is received by, for example, translator 202 or another gateway or portal service such as load balancer 212. The network traffic includes messages which include respective headers. In some examples, the headers include, for example and without imputing limitation, metadata, destination information, origin information, and various other fields.

At step 504, a heuristic value is injected into the header based on a determined service characteristic (e.g., Quality of Service (QOS), etc.). The heuristic value can be of any sufficiently distinguishable kind. For example, a color coding can be applied where high priority messages are coded (e.g., a color value is inserted into a metadata field in a message header) as red, default priority are coded as yellow, and low priority are coded as green.

At step 506, the network traffic is then forwarded through a service mesh (e.g., service mesh 110) based on rulesets corresponding to the heuristic value. For example, each microservice receiving the network traffic may retrieve the color coding in the message header and, after processing the message, forward it and/or a result of the processing to a next microservice based at least in part on the color code (e.g., a red coded message may be forwarded to a high performance microservice in order to provide a particular speed or latency guarantee or the like).

Figure 6:
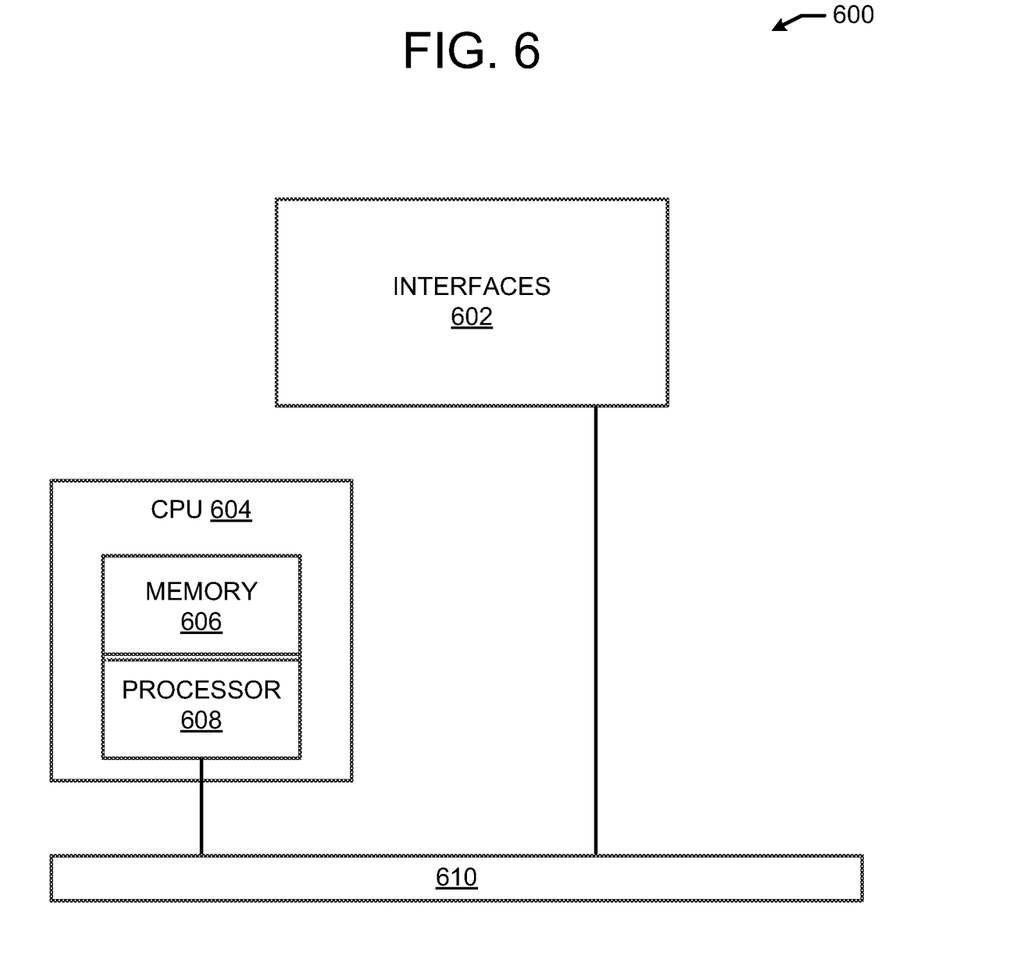
FIG. 6 illustrates an example network device in accordance with various embodiments.
Figure 7:
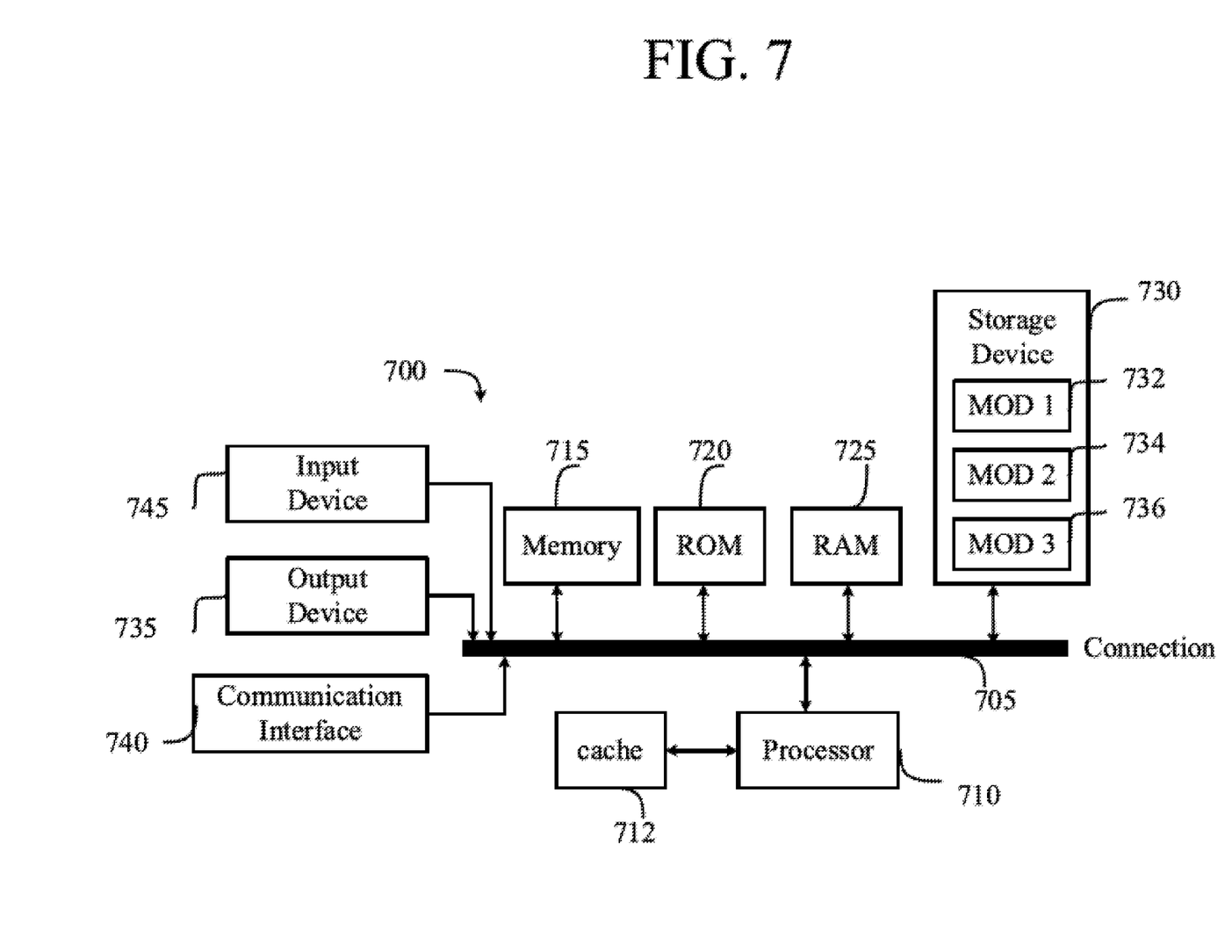
FIG. 7 illustrates an example computing device in accordance with various embodiments.

The disclosure now turns to FIGS. 6 and 7, which illustrate example network devices and computing devices, such as switches, routers, load balancers, client devices, and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method for differentiating service within a service mesh, the method comprising:
    receiving over a communications network, by a translator, a message for processing by a service mesh, the message comprising a service characteristic for servicing the message over the communications network and the service mesh comprising one or more microservices;
    generating, by the translator, a ruleset for servicing the message within the service mesh based on the service characteristic, the ruleset comprising one of forwarding rules or load-balancing rules;
    transmitting the ruleset, by the translator, to at least one of the one or more microservices; and
    transmitting, by the translator, the message to the service mesh.

2. The method of claim 1, further comprising:
    injecting, by the translator, into the message a heuristic indicator corresponding to the service characteristic;
    wherein the service mesh processes the message based on the heuristic indicator.

3. The method of claim 1, further comprising:
    injecting, by the translator, into the message a destination for the message, the destination associated with the service characteristic;
    wherein each of the one or more microservices of the service mesh is respectively associated with one or more respective message destinations, at least a portion of the one or more respective message destinations including the destination for the message.

4. The method of claim 1, wherein each of the one or more microservices is associated with a respective sidecar.

5. The method of claim 1, wherein the one or more microservices are instantiated services.

6. The method of claim 1, wherein the one or more microservices includes at least one load-balancer microservice.

7. The method of claim 1, wherein the service characteristic comprises a Quality of Service (QOS).

8. A system for differentiating service within a service mesh, the system comprising:
    one or more processors;
    a service mesh comprising one or more microservices for processing messages over a network, the messages comprising a respective service characteristic for servicing the message over a communications network; and
    a memory storing instructions that, when executed by the one or more processors, cause the one or more processors to:

receive over the communications network, by a translator, at least one of the messages for processing by the service mesh;

generate, by the translator, a ruleset for servicing the message within the service mesh based on the service characteristic, the ruleset comprising one of forwarding rules or load-balancing rules;

transmit the ruleset, by the translator, to at least one of the one or more microservices; and transmit, by the translator, the message to the service mesh.

9. The system of claim 8, wherein the memory further comprises instructions that, when executed by the one or more processors, cause the one or more processors to:

inject, by the translator, into the message a heuristic indicator corresponding to the service characteristic;

wherein the service mesh processes the message based on the heuristic indicator.

10. The system of claim 8, wherein the memory further comprises instructions that, when executed by the one or more processors, cause the one or more processors to:

inject, by the translator, into the message a destination for the message, the destination associated with the service characteristic;

wherein each of the one or more microservices of the service mesh is respectively associated with one or more respective message destinations, at least a portion of the one or more respective message destinations including the destination for the message.

11. The system of claim 8, wherein each of the one or more microservices is associated with a respective sidecar.

12. The system of claim 8, wherein the one or more microservices are instantiated services.

13. The system of claim 8, wherein the one or more microservices includes at least one load-balancer microservice.

14. The system of claim 8, wherein the service characteristic comprises a Quality of Service (QOS).

15. A non-transitory computer readable medium storing instructions that, when executed by one or more processors, cause the one or more processors to:

receive over a communications network, by a translator, a message for processing by a service mesh, the message comprising a service characteristic for servicing the message over the communications network and the service mesh comprising one or more microservices;

generate, by the translator, a ruleset for servicing the message within the service mesh based on the service characteristic, the ruleset comprising one of forwarding rules or load-balancing rules;

transmit the ruleset, by the translator, to at least one of the one or more microservices; and transmit, by the translator, the message to the service mesh.

16. The non-transitory computer readable medium of claim 15, further comprising instructions that, when executed by the one or more processors, cause the one or more processors to:

inject, by the translator, into the message a heuristic indicator corresponding to the service characteristic;

wherein the service mesh processes the message based on the heuristic indicator.

17. The non-transitory computer readable medium of claim 15, further comprising instructions that, when executed by the one or more processors, cause the one or more processors to:

inject, by the translator, into the message a destination for the message, the destination associated with the service characteristic;

wherein each of the one or more microservices of the service mesh is respectively associated with one or more respective message destinations, at least a portion of the one or more respective message destinations including the destination for the message.

18. The non-transitory computer readable medium of claim 15, wherein each of the one or more microservices is associated with a respective sidecar.

19. The non-transitory computer readable medium of claim 15, wherein the one or more microservices includes at least one load-balancer microservice.

20. The non-transitory computer readable medium of claim 15, wherein the service characteristic comprises a Quality of Service (QOS).

* * * * *